Dec. 15, 1931.  J. D. ELMS  1,836,584
MOTION PICTURE CAMERA
Filed Dec. 16, 1927  4 Sheets-Sheet 1
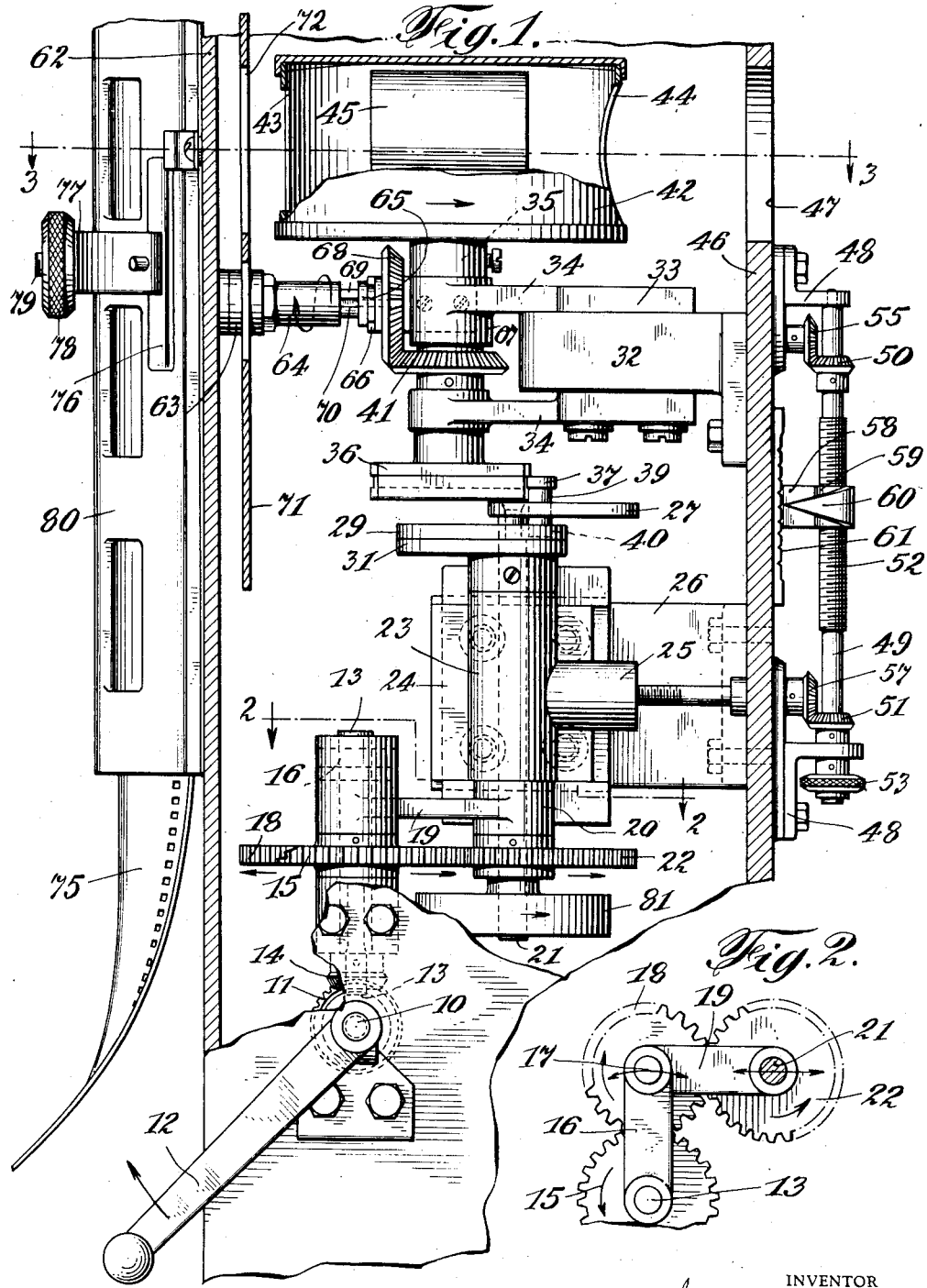

Dec. 15, 1931. J. D. ELMS 1,836,584
MOTION PICTURE CAMERA
Filed Dec. 16, 1927 4 Sheets-Sheet 2

Dec. 15, 1931.  J. D. ELMS  1,836,584
MOTION PICTURE CAMERA
Filed Dec. 16, 1927   4 Sheets-Sheet 3

INVENTOR
John D. Elms
his ATTORNEY

Dec. 15, 1931.    J. D. ELMS    1,836,584
MOTION PICTURE CAMERA
Filed Dec. 16, 1927    4 Sheets-Sheet 4
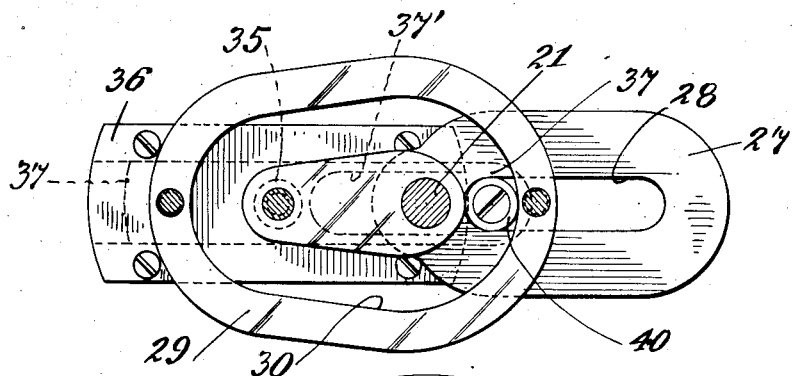
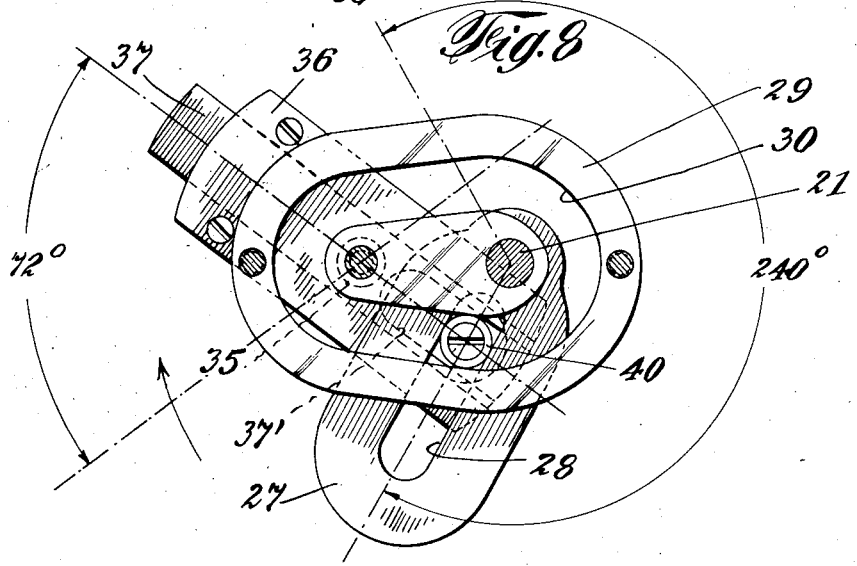
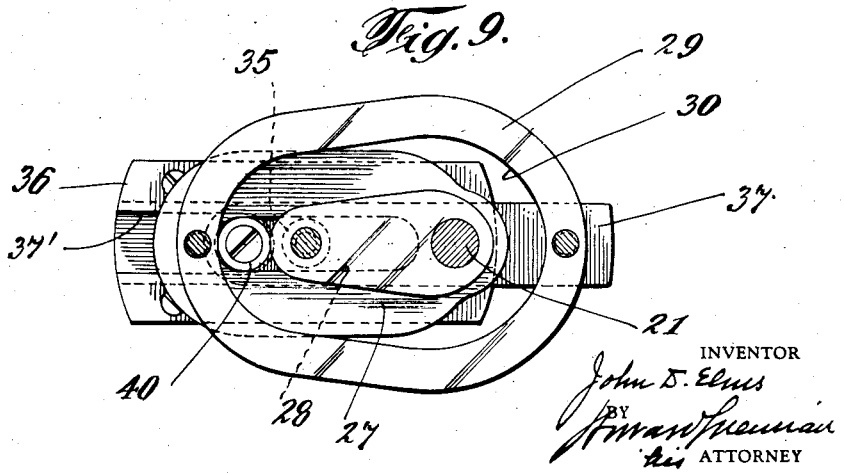

Patented Dec. 15, 1931

1,836,584

UNITED STATES PATENT OFFICE

JOHN D. ELMS, OF ST. GEORGE, NEW YORK, ASSIGNOR, BY MESNE ASSIGNMENTS, TO FELMS REVO CORPORATION, OF NEW YORK, N. Y., A CORPORATION OF NEW YORK

MOTION PICTURE CAMERA

Application filed December 16, 1927. Serial No. 240,430.

My invention relates to motion picture cameras and refers particularly to motion picture cameras having a revolving lens.

One of the essential features of a motion picture camera is that sufficient light enters the camera during the period of exposure in order that proper photographic images may be impressed upon the photographic film.

This necessary element is difficult to obtain because of the shortness of the period of exposure due to the rapidity of successive exposures.

Revolving lenses have many advantages over fixed lenses, especially in the taking of wide pictures in which the arc of lens exposure is greater than that of the ordinary picture.

Difficulty has been experienced in the use of revolving lenses because the arc of revolution during the unexposed period is much greater than that of the exposed period, and hence a constant speed of revolution of the lens which is adapted in movement to the rapidity of the successive exposures, is so rapid during the exposed period as to prevent the admission of sufficient light.

Conversely, if the speed of revolution of the lens is adapted to admit sufficient light during the exposed period, its movement is too slow to allow of the rapid successive exposures.

Further, it is evident that the movement of the lens during the exposed period should be uniform in order that the entire film impression may be uniform both as regards admitted light and the proper impression of moving objects.

It is also evident that the film should be parallel with respect to the plane of the lens movement with the optical center of the lens as the center of the film arc, in order that the entire film face may be in proper lens focus.

It is also desirable that the lens may be focussed during the taking of pictures in order that it may be adapted to different objects during the operating period.

All of the above and other desirable attributes are possessed by the camera of my invention which presents a means whereby photographic images may be impressed upon a curved photographic film by means of a revolving lens, the lens having a retarded uniform speed of movement during the exposed period and an accelerated speed of movement during the unexposed period, focussing being possible during the operation of the camera.

My camera is also of such construction that the relationship of speeds of the lens between the exposed and unexposed periods and the arc of the exposed retarded uniform movement may be readily changed by changing the contour of its cam.

In the accompanying drawings illustrating one form of the device of my invention, similar parts are designated by similar numerals.

Figure 1 is a side view of one form of the device of my invention, partly broken away for purposes of clearness of description.

Figure 2 is a section through the line 2—2 of Figure 1.

Figures 7, 8 and 9, are views showing several positions of the cam movements during the rotation of the driving shaft taken on line 7—7 of Figure 4.

Figure 3:
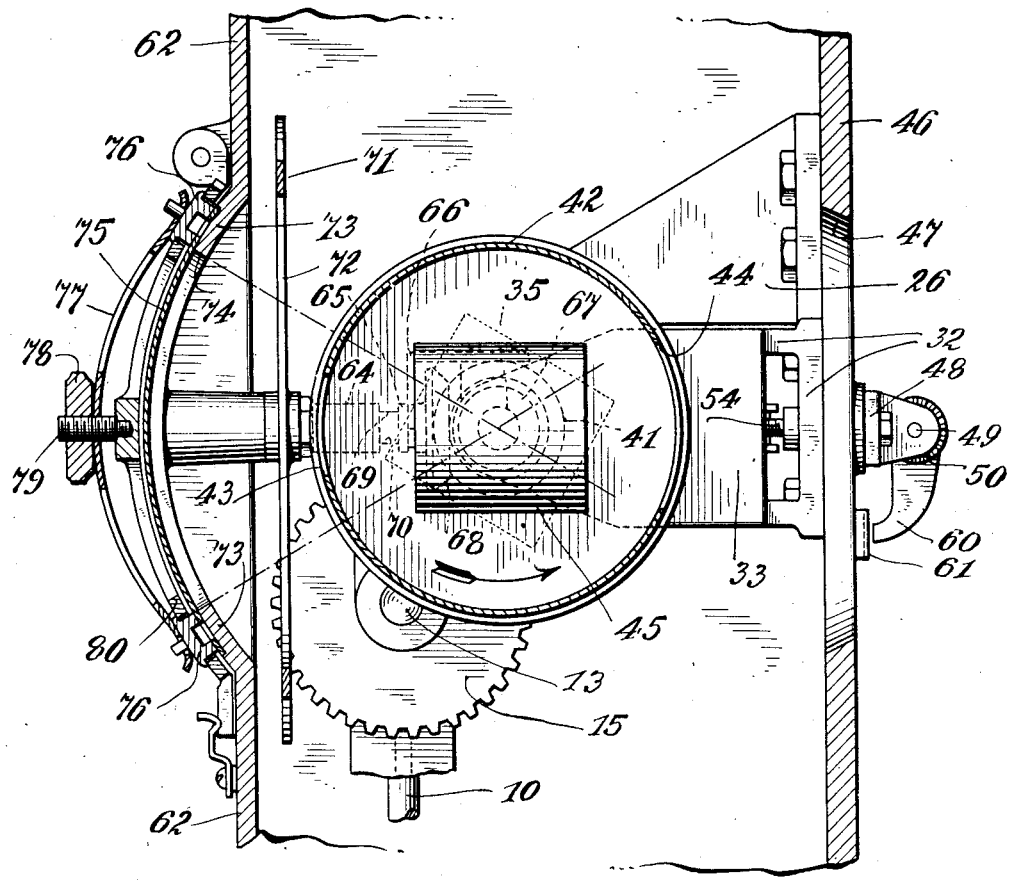
Figure 3 is a section through the line 3—3 of Figure 1.
Figure 6:
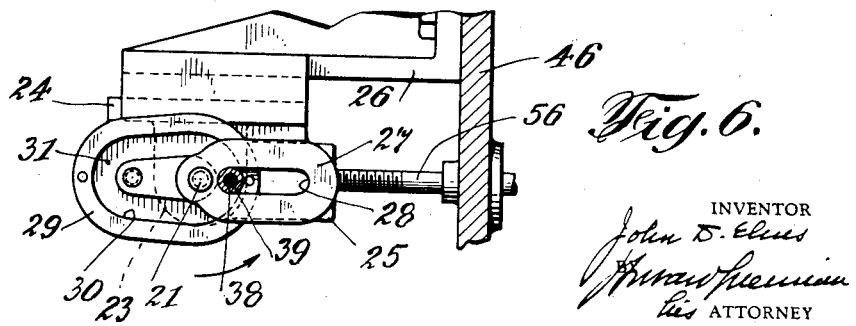
Figure 6 is a section through the line 6—6 of Figure 4.

The particular form of the device of my invention shown in the accompanying drawings comprises a rotatable shaft 10, Figs. 1 and 3, carrying the fixedly attached bevel gear 11 and the operating handle 12. A vertical rotatable shaft 13, carries the fixedly attached bevel gear 14 meshing with the bevel gear 11 and the fixedly attached gear 15. A link 16 pivotally connects the shaft 13 with the rotatable shaft 17, Fig. 3, the latter carrying a fixedly attached gear 18 meshing with the gear 15. A link 19 pivotally connects the shaft 17 with the sleeve 20 of the rotatable driving shaft 21, Figs. 1, 2, 4 and 6, the latter carrying a fixedly attached gear 22 meshing with the gear 18. The shaft 21 carries a sleeve 23, Figs. 1, 4 and 6, which in turn is carried by the movable plate 24 and has an extended interiorly threaded member 25. The plate 24 is slidably movable within and supported by the fixed plate 26.

The upper portion of the shaft 21 carries the fixedly attached carrier 27, Figs. 1, 4 and 6 to 9, having a longitudinal opening 28.

A cam 29, having the cam runway 30 is attached to and carried by the integral member 31, of the sleeve 23.

The rotation of the shaft 21, therefore, revolves the carrier 27 around said shaft, while the cam 29 is stationary.

Carried by, and slidable upon, the support 32, Figs. 1, 3, 4 and 5, is a plate 33, the two extended arms 34, 34 of which act as bearings for the rotatable shaft 35, (see also Fig. 7).

The lower end of the shaft 35 carries a fixedly attached plate 36, Figs. 1, 4, 5, 7, 8 and 9, within which is the slidable member 37 having an opening 37'. A screw 38 carried by the slidable member 37 carries the roller 39 within the opening 37' of the member 37 and the opening 28 of the carrier 27 and the roller 40 within the cam runway 30.

The shaft 35 carries the fixedly attached bevel gear 41 and a lens housing 42, Figs. 1 and 3, having the opposite openings 43 and 44 and containing the lens 45 revoluble with the housing, which is carried by the upper extremity of the driven shaft 35.

As the driving shaft 21 rotates it revolves the carrier 27 with the shaft as a center. The roller 39 slidable within the opening 28 of the carrier and attached to the slidable member 37 rotates the driven shaft 35, but, as the screw 38, which carries the roller 39 within the opening 28, also carries the roller 40 within the cam runway 30, it is evident that the relationship between the speeds of rotation of the shafts 21 and 35 will depend upon the contour, or shape, of the cam runway 30, and, as shown in Figures 7, 8 and 9, the cam runway 30 shown for the particular construction illustrated in the accompanying drawings, is of such contour that a uniform speed of rotation of the driving shaft 21 will give a uniform speed of rotatable movement to the driven shaft 35 during a 72° rotation of the driven shaft 35 and a much more rapid movement of the driven shaft during the remainder of its rotation, the ratio of rapidity being in this case 2 to 1. In other words, it takes the driven shaft twice as long to rotate 72° as it does the remainder of its rotation.

The plates 26 and 32 are supported by the front 46 of the casing having an aperture 47 therein.

Figure 4:
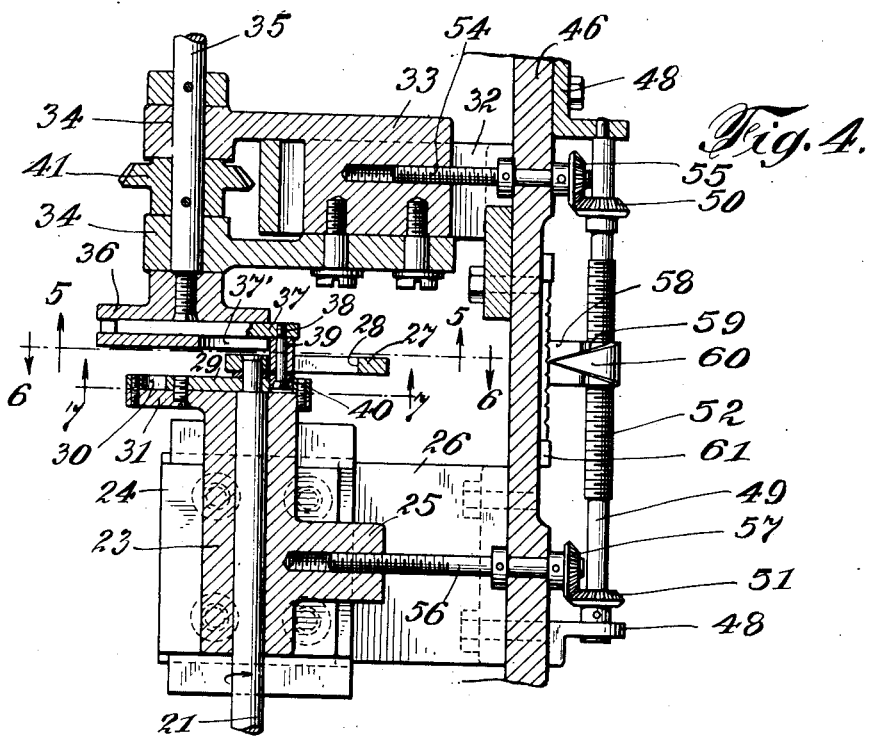
Figure 4 is a vertical cross-section of the shaft operating means of Figure 1.
Figure 5:
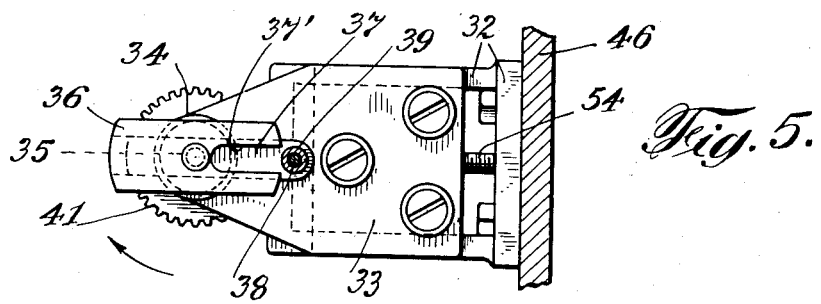
Figure 5 is a section through the line 5—5 of Figure 4.

Exterior of the casing 46 and supported by the brackets 48, 48, Figs. 1, 3 and 4, is a rotatable shaft 49 carrying the fixed bevel gears 50, 51 and having its central portion 52 threaded. The lower extremity of the shaft 49 carries the annular member 53 for ease of manipulation.

A threaded member 54 rotatable within an opening in the casing 46 is threaded within a threaded opening within the slidable member 33, and carries a bevel gear 55 meshing with the bevel gear 50.

A threaded member 56 rotatable within an opening in the casing 46 is threaded within the threaded opening within the member 25 of the slidable member 23 and carries a bevel gear 57 meshing with the bevel gear 51.

A non-revoluble member 58 has an interiorly threaded sleeve 59 threaded with the shaft 52 and a pointer 60. A scale 61 is attached to the casing front 46.

The rotation of the shaft 49 will move the sleeve 23 and plate 33 in unison inwardly and outwardly with respect to the casing front 46 and thus also move all the mechanism carried by the sleeve and plate. The pointer 60 will move along the shaft 49 and will indicate upon the scale 61.

The lens 45 can thus be focussed while the mechanism is in movement.

Attached to the casing back 62, Fig. 1, is a bearing 63 supporting the rotatable hollow shaft 64.

A hub 65 is supported rotatably by the forked support 66, carried by the bearing 67 of the member 34, the forks of the support 66 being positioned within an annular groove within the hub 65. The hub 65 carries the bevel gear 68 meshing with the bevel gear 41.

The extended portion 69 of the shaft 64 is slidably movable within the hub 65 and has a keyway 70 within which is fitted a key carried internally by the hub 65.

The hub 65, therefore, may move longitudinally with respect to the member 69 but the rotation of the hub 65 will cause a rotation of the member 69 and the shaft 64.

The shaft 64 carries the fixedly attached shutter 71 having the opening 72.

It will thus be seen that the slidable movement of the mechanism for focusing will not disengage the shaft 64 and the bevel gear 68 from the gear 41 carried by the driven shaft 35.

In order that the face of the photographic film may be in focus with the lens during the revolution of the latter, the film is maintained in curved position to agree with the arc of the lens revolution which is accomplished as follows:—

The casing rear 62 has a portion 73 which is curved outwardly and within which is an opening 74 having the desired optical angle with respect to the lens 45, the film 75 being moved vertically across the opening 74 by any suitable intermittent moving mechanism. The film 75 is maintained in taut position by means of the elements 76, 76 brought into proper abutment with the film by means of the controllable spring 77, which is operated by the knurled internally threaded member 78 threaded upon the member 79.

A balance wheel 81 is attached to the shaft 21.

The operation of the device is as follows:—

A uniform speed of rotation is given the shaft 10 which uniform speed is transferred to the driving shaft 21. The carrier 27 is thus given a uniform speed of revolution around the driving shaft 21. This movement of the driving shaft 21 is transmitted to the driven shaft 35 through the medium of the rollers 39 and 40, which are carried by the slidable member 37 and which operate respectively within the opening 28 of the carrier 27 and within the runway 30. The rotation of the driven shaft 35 revolves the lens housing 42 and the lens 45, causing the latter to pass across the face of the opening 47 at each revolution.

As the lens passes across the opening 47 of the casing front 46, a photographic impression is made upon the film 75 through the opening 72 of the shutter 71. During the further revolution of the lens the shutter 71 interrupts the passage of light through the opening 74 of the casing back 73 and the film 75 is moved into position for the next photographic impression.

As it is the object of the invention to maintain a uniform retarded movement of the lens during the exposure period and to obtain an accelerated movement of the lens during the unexposed period, this is accomplished by giving the runway in the cam such a contour that a uniform speed of rotation of the driving shaft will transmit a uniform speed of rotation to the driven shaft for a predetermined arc of revolution of the lens and will then transmit a higher speed of rotation to the driven shaft for the remainder of the revolution of the lens.

One method of accomplishing this desired result is illustrated in Figures 7, 8 and 9.

In Figure 7, the roller 40 is in alignment with the driving shaft 21 and the driven shaft 35.

In Figure 8, the roller 40 has been moved 120° from its former position with respect to the driving shaft 21 and 36° with respect to the driven shaft 35.

In Figure 9, the roller 40 has been moved until it is again in alignment with the shafts 21 and 35 but it is now at the opposite end of the cam runway from that shown in Figure 7.

The figures, therefore, show three positions in a half rotation of the driving shaft 21.

The contour of the right hand portion of the cam runway is such that a uniform speed of rotation through an arc of 120° of the driving shaft 21 from the dead end of the runway upon either side thereof will cause a uniform speed of rotation through an arc of 36° of the driven shaft 35.

Thus, during a uniform speed of rotation through an arc of 240° of the driving shaft, the driven shaft will have a uniform speed of rotation through an arc of 72° and the mechanism will be as shown in Figure 8.

As the driving shaft continues its uniform speed of rotation the distance of the roller 40 from the driving shaft increases, and hence, its speed of movement increases, thus rotating the driven shaft more rapidly, the mechanism then being as shown in Figure 9.

The further rotation of the driving shaft moves the roller 40 at a gradually reduced speed to the point of the runway where it again obtains a uniform slower movement.

It is evident that the length of arc of retarded uniform movement and the relation of speeds between the retarded and accelerated movements can be varied by varying the contour of the cam runway, but for the purposes of the illustrated form of the device of my invention, I show the retarded uniform movement of an arc of 72° of rotation of the driven shaft, the period of time of the retarded movement being twice that of the accelerated movement.

It will thus be seen, that by means of my device a uniform retarded movement is imparted to the revolving lens during the exposed period and an accelerated movement imparted to it during the unexposed period and that the lens may be focussed while the lens is in movement.

I do not limit myself to the particular size, shape, number or arrangement of parts as shown and described as these are given simply as a means for clearly describing the device of my invention.

What I claim is:—

1. In a motion picture camera the combination of a revoluble lens, driving means for revolving said lens, and a driving connection between said driving means and said lens for causing said lens to revolve at a uniform retarded speed across the arc of exposure and at higher accelerated and decelerated speeds across the arc of non-exposure upon an operation of the driving means at a uniform speed.

2. In a motion picture camera the combination of a revoluble lens, and means for revolving said lens at a uniform retarded speed across the arc of exposure and at a higher speed across the arc of non-exposure.

3. In a motion picture camera the combination of a revoluble lens, a rotatable shaft supporting said lens, a rotatable driving shaft, and a driving connection between said shafts operable upon rotation of the driving shaft at a uniform speed to cause the lens supporting shaft to revolve the lens at a uniform retarded speed across the arc of exposure and at a higher speed across the arc of non-exposure.

4. In a motion picture camera the combination of a revoluble lens, a rotatable shaft supporting said lens, a rotatable driving shaft, a driving connection between said shafts operable upon rotation of the driving shaft at a uniform speed to cause the lens supporting shaft to revolve the lens at a uniform retarded speed across the arc of exposure and at a higher speed across the arc of non-exposure, means for focusing said lens by movement of said lens supporting shaft, and means for simultaneously moving said driving shaft to maintain the relative driving connection between said shafts.

5. In a motion picture camera the combination of a revoluble lens, a rotatable shaft supporting said lens, a driving shaft parallel to and in non-axial relation with said supporting shaft, a slotted driving arm mounted on said driving shaft, a crank arm slidably but non-rotatably mounted on said supporting shaft, a fixed cam plate provided with a cam runway surrounding said shafts, and a pin on said crank arm operating in a slot of said driving arm and in said cam runway, a portion of said cam runway being concentric with said driving shaft to impart uniform retarded speed to said supporting shaft and lens across the arc of exposure.

6. In a motion picture camera the combination of a revoluble lens, a rotatable shaft supporting said lens, a driving shaft parallel to and in non-axial relation with said supporting shaft, a slotted driving arm mounted on said driving shaft, a crank arm slidably but non-rotatably mounted on said supporting shaft, a fixed cam plate provided with a cam runway surrounding said shafts, a pin on said crank arm operating in a slot of said driving arm and in said cam runway, a portion of said cam runway being concentric with said driving shaft to impart uniform retarded speed to said supporting shaft and lens across the arc of exposure, and means for focusing said lens and maintaining the driving relation between said shafts by simultaneosuly moving said lens supporting shaft and said driving shaft.

7. The combination with a revoluble lens and means for revolving said lens at a uniform retarded speed across the arc of exposure and at a higher speed across the arc of non-exposure, of a shutter cooperating with said lens, and means for operating said shutter in synchronism with said lens.

8. The combination with a movable lens and means for moving said lens at a uniform speed of movement across the arc of exposure and at a different speed across the arc of non-exposure, of a shutter, and means for operating said shutter in synchronism with said lens.

9. The combination of a movable lens, and means for moving said lens at a uniform speed of movement across the arc of exposure and at a different speed across the arc of non-exposure.

Signed at New York city in the county of New York and State of New York this 14th day of December, 1927.

JOHN D. ELMS.